(12) United States Patent
Nickisch

(10) Patent No.: US 8,102,817 B2
(45) Date of Patent: Jan. 24, 2012

(54) METHOD OF MEASUREMENT REPORTING AND CELLULAR RADIO TERMINAL

(75) Inventor: Dirk Nickisch, Neubiberg (DE)

(73) Assignee: Infineon Technologies Delta GmbH, Neubiberg (DE)

( * ) Notice: Subject to any disclaimer, the term of this patent is extended or adjusted under 35 U.S.C. 154(b) by 174 days.

(21) Appl. No.: 12/427,769

(22) Filed: Apr. 22, 2009

(65) Prior Publication Data

US 2010/0271952 A1  Oct. 28, 2010

(51) Int. Cl.
 H04W 4/00  (2009.01)
 H04B 7/216  (2006.01)
 H04B 3/46  (2006.01)
(52) U.S. Cl. .................. 370/331; 370/342; 375/224
(58) Field of Classification Search .......... 370/241, 370/310, 331–332, 338
See application file for complete search history.

(56) References Cited

U.S. PATENT DOCUMENTS

| 6,922,395 | B1 * | 7/2005 | Elliott et al. | 370/241 |
| 7,035,284 | B2 * | 4/2006 | Willenegger et al. | 370/470 |
| 7,136,638 | B2 * | 11/2006 | Wacker et al. | 455/424 |
| 7,254,159 | B1 * | 8/2007 | Lavelle et al. | 375/141 |
| 7,420,924 | B2 * | 9/2008 | Kitamori et al. | 370/241 |
| 2008/0287105 | A1 * | 11/2008 | Wu | 455/412.1 |
| 2009/0245203 | A1 * | 10/2009 | Pani et al. | 370/331 |
| 2009/0279673 | A1 * | 11/2009 | Maffre et al. | 379/1.03 |
| 2010/0034171 | A1 * | 2/2010 | Pelletier et al. | 370/331 |

* cited by examiner

Primary Examiner — Huy Vu
Assistant Examiner — Brandon Renner

(57) ABSTRACT

A method of measurement reporting and a cellular radio terminal are provided. A method of measurement reporting comprises receiving, while a measurement reporting scheme is active, a request for a radio connection reconfiguration, suspending the measurement reporting scheme upon the receiving a request and resuming the suspended measurement reporting scheme upon a completion of the radio connection reconfiguration. A cellular radio terminal is configured to carry out the method of measurement reporting.

10 Claims, 3 Drawing Sheets

METHOD OF MEASUREMENT REPORTING AND CELLULAR RADIO TERMINAL

TECHNICAL FIELD

Embodiments of the invention relate generally to a method of measurement reporting and to a cellular radio terminal.

BRIEF DESCRIPTION OF THE SEVERAL VIEWS OF THE DRAWINGS

In the drawings, like reference characters generally refer to the same parts throughout the different views. The drawings are not necessarily to scale, emphasis instead generally being placed upon illustrating the principles of the invention.

DETAILED DESCRIPTION OF THE INVENTION

The following detailed description explains exemplary embodiments of the present invention. Where applicable the description of a method embodiment is deemed to describe also the functioning of a corresponding apparatus embodiment and vice versa. The description is not to be taken in a limiting sense, but is made only for the purpose of illustrating the general principles of the invention. The scope of the invention, however, is only defined by the claims and is not intended to be limited by the exemplary embodiments described below.

Figure 1:
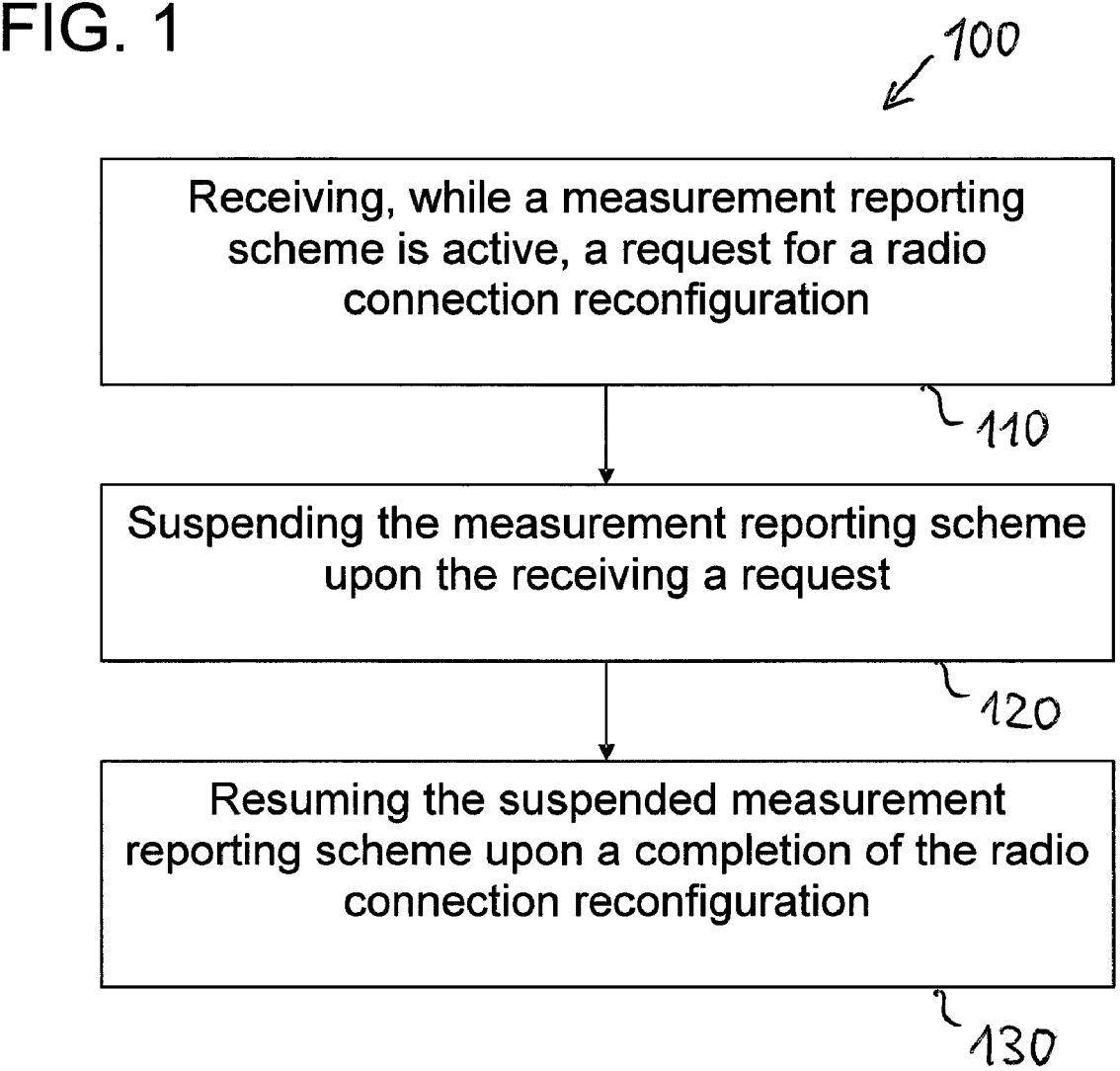
FIG. 1 shows a method of measurement reporting in accordance with an embodiment of the invention in a flow diagram.

In FIG. 1 a method of measurement reporting in accordance with an embodiment of the invention is shown in a flow diagram 100.

At 110, a request for a radio connection reconfiguration is received, while a measurement reporting scheme is active.

At 120, the measurement reporting scheme is suspended upon the receiving a request.

At 130, the suspended measurement reporting scheme is resumed upon a completion of the radio connection reconfiguration.

When a mobile phone (or, more generally speaking, a cellular radio terminal) is in connected mode and a call (or, more generally speaking, a cellular radio communication) is ongoing the connection needs to be maintained all the time. When the user is moving around the quality of the radio signals of the cells used for the connection and also the reception quality on the neighbour cells will change. To maintain the call those cells should be used for the connection, which the terminal can receive best.

Which cells are used for the connection is finally based on decisions taken by the cellular radio network. But for this decision the terminal needs to provide the information about the cell quality to the network by sending measurement reports. The measurement reports contain the measured cell levels sorted to their quality and also an explicit indication which cell or cells have to be added or removed from the connection. Based on those measurement reports the network will react and add or remove cells from the connection. The trigger to send measurement reports is based on thresholds configured by the network.

For any cellular radio system it is essential that the terminal (in a UMTS system referred to as user equipment, UE) is connected to a proper specific radio cell served by a base station (in a UMTS system referred to as NodeB), which is usually located in the vicinity of the terminal. A single NodeB can have multiple sectors or cells. Signals sent out from the NodeB in this cell need to be received with a quality that allows data reception with a sufficient quality. Due to mobility of the UE this serving cell can change via handover procedures which are under the control of UTRAN. The UE supports such a handover procedure with measurement reports (MR) indicating that new cells pop up or other cells disappeared. The measurements to be performed and reported by UE are setup by UTRAN.

In a UMTS system based on W-CDMA and FDD mode as specified by 3GPP, a UE-specific so-called Active Set (AS) is defined. The AS is a list which consists of up to six cells. All cells of the AS operate in the same frequency band and the UE has simultaneous connections to all cells of its AS. All cells of the AS send the same data in DL to allow a smooth Soft Handover (SHO) between different cells. A proper MR can trigger an AS update (ASU) by the network (UTRAN), i.e. UTRAN controls which cell to add, replace or delete in the AS. The main principle is the AS should contain only the strongest cells, i.e. the cells with the best signal quality.

For mobility management reasons, the UE has to constantly measure the AS cells, as well as neighboring cells not belonging to the AS. The measurements include the received signal code power (RSCP) of the primary common pilot channel (CPICH) and the CPICH chip signal-to-noise ratio (Ec/No). A cell can be identified by its primary CPICH. The UE is configured by UTRAN which measurements to perform (e.g. intra-frequency measurements, inter-frequency measurements, inter-RAT measurements) and the associated measurement reporting events with which the corresponding MR are triggered if the criteria for the events are fulfilled.

The measurement reporting rules according to the configuration mentioned in the preceding paragraph define a measurement reporting scheme. In other words, the rules governing which measurement reports under what circumstances are due to be sent to the network are referred to as a measurement reporting scheme. A measurement reporting scheme is considered to be active or resumed if the UE performs according to that rules, i.e. the UE sends measurement reports when these are due according to that rules. A measurement reporting scheme is considered to be not active or suspended if the UE does not perform according to that rules, i.e. the UE does not send any measurement reports even if these are due according to that rules.

The following problem is observed in field testing: UTRAN might reconfigure the radio connection, for example to reconfigure for the data rates applied by the UE. UTRAN therefore might request a radio connection reconfiguration from the UE, i.e. it might request to reconfigure the UE, for example by sending one of the commands "Physical Channel Reconfiguration", "Transport Channel reconfiguration" or "Radio Bearer Reconfiguration". Often the UTRAN uses, i.e. specifies, a starting time by when the new configuration must be applied by the UE. While UE waits for the starting time to be expired the changing radio conditions might lead to the need of sending measurement reports to the network. It was observed that the network does not respond to those measurement reports until the starting time of the reconfiguration has expired and UE confirmed the reconfiguration. As it can take up to 2.5 seconds until the starting time expires the information contained in the measurement reports sent while reconfiguration was ongoing might not be valid anymore at the point of time the network handles the reports and reacts on them. This leads to suboptimal handling of cells used for the connection and causes call drops.

When the used measurement reporting scheme is active all the time the measurement reports are sent irrespective if there is a reconfiguration ongoing or not. In case of an ongoing reconfiguration the network starts acting upon the measurement reports received while the reconfiguration was still ongoing only after the reconfiguration is finished. As some reports had been sent by UE to the network some seconds ago, the contained data might not anymore reflect the current situation. It was observed that the network reacts to the reports in order of their reception, which results in acting on old data first and on new data latest.

Figure 2:
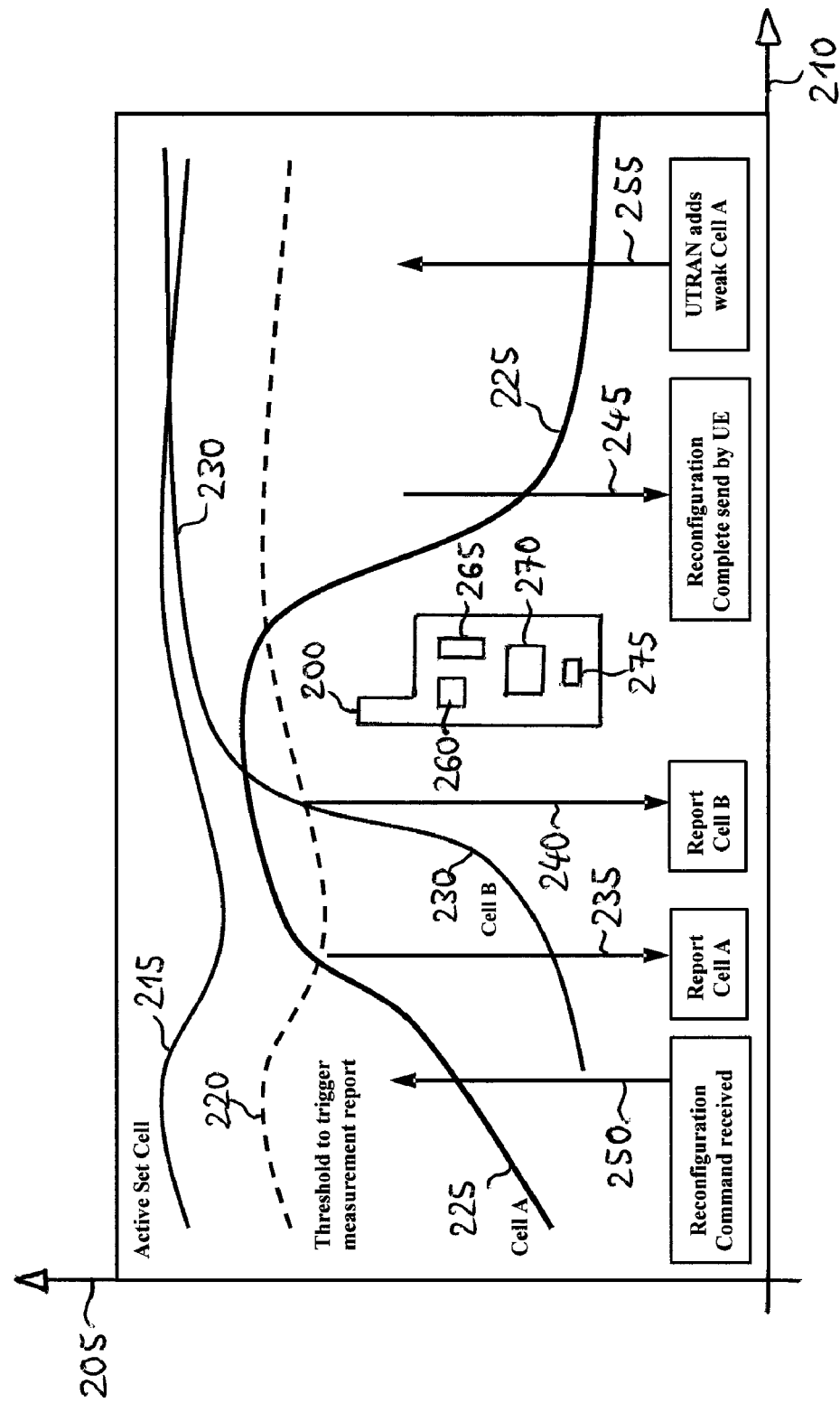
FIG. 2 shows a scenario of measurement reporting and radio connection reconfiguration and a cellular radio terminal in accordance with embodiments of the invention in a combined diagram.

In FIG. 2 a scenario of measurement reporting and radio connection reconfiguration and a cellular radio terminal 200 in accordance with embodiments of the invention are shown in a combined diagram.

The vertical axis 205 represents a radio connection quality parameter, for example a received radio signal strength, at the cellular radio terminal 200. The horizontal axis 210 represents time.

The curve 215 indicates the signal from an "Active Set Cell" over time. The dashed curve 220 indicates a threshold to trigger measurement reports. The threshold depends on the signal from the "Active Set Cell" and therefore varies with time. Any new cells entering the reception range and exhibiting a signal above the current threshold value have to be reported to the network in a measurement report. The curve 225 indicates the signal from another "Cell A" over time. The curve 230 indicates the signal from yet another "Cell B" over time.

The downward arrows 235, 240, 245 symbolize messages sent from the cellular radio terminal 200 to the network. The upward arrows 250, 255 symbolize messages sent from the network to the cellular radio terminal 200. The individual positions of the downward arrows 235, 240, 245 and the upward arrows 250, 255 along the horizontal axis 210 indicate the individual points of time when the respective messages are sent.

First the problems associated with measurement reports sent during an ongoing reconfiguration are illustrated further.

It is assumed that the used measurement reporting scheme is active and a reconfiguration was started by the reconfiguration command denoted by the upward arrow 250 and is still running. Now the signal from neighbour cell A (curve 225) becomes quite good and increases above the threshold (dashed curve 220). The UE (cellular radio terminal 200) sends a measurement report (downward arrow 235) to add cell A to the connection. But as the network is busy due to the ongoing reconfiguration no change in the cells used for the connection takes place immediately. Short time later also the signal from cell B (curve 230) increases and crosses the threshold (dashed curve 220). The UE sends another measurement report (downward arrow 240) for cell B. In the given scenario the signal from cell A (curve 225) decreases again and becomes so weak that it makes no sense anymore to add this cell to the connection. This happens before the reconfiguration is finished and before the network can react on the received measurement reports.

But, when the reconfiguration is finished the UE sends the reconfiguration complete message denoted by the downward arrow 245. Now the network reacts on the received measurement reports, but processes the report for cell A first as it was received first. Cell A is added to the connection (upward arrow 255) despite cell A is very weak but the good cell B is not (yet) added. The problem about this scenario is that the network will add weak cells to the connection while good neighbour cells might not be used or might only be used with considerable delay in time. This may result in dropping the voice call or interrupting the data call, which gives a bad user experience.

According to an embodiment of the invention, no measurement reports are sent during an ongoing reconfiguration. This has the effect to avoid inappropriate network reaction. In an embodiment, the measurement reports arising during an ongoing reconfiguration are stored. In an embodiment, needed reports are sent later when the reconfiguration is finished. In an embodiment, the later sent reports are included in the reconfiguration complete message. In an embodiment, the later sent reports are arranged in an order which indicates their prioritizing according to their importance.

According to an embodiment of the invention, the cellular radio terminal 200 has a send unit 260 to send measurement reports, for example a report on "Cell A" (downward arrow 235) and a report on "Cell B" (downward arrow 240). It also has a receive unit 265 to receive, while a measurement reporting scheme is active, a request for a radio connection reconfiguration, for example the reconfiguration command denoted by the upward arrow 250.

According to that embodiment, the cellular radio terminal 200 further has a control unit 270 to suspend the measurement reporting scheme upon a receiving a request for a radio connection reconfiguration, the control unit 270 further to resume the suspended measurement reporting scheme upon a completion of the radio connection reconfiguration. For example, the control unit 270 is configured to suspend the measurement reporting scheme upon receiving the reconfiguration command denoted by the upward arrow 250. For example, the control unit 270 is configured to resume the suspended measurement reporting scheme upon sending the reconfiguration complete message denoted by the downward arrow 245. In this exemplary case the report on "Cell A" (downward arrow 235) and the report on "Cell B" (downward arrow 240) will not be sent at the respective denoted points of time despite these reports are due according to the rules of the measurement reporting scheme.

According to another embodiment of the invention, the cellular radio terminal 200 further has a store unit 275 to store one or more measurement reporting events, the one or more measurement reporting events occurring after a suspending the measurement reporting scheme upon a receiving a request for a radio connection reconfiguration and occurring before a resuming the suspended measurement reporting scheme upon a completion of the radio connection reconfiguration. For example, the store unit 275 is configured to store the two measurement reporting events underlying the report on "Cell A" (downward arrow 235) and the report on "Cell B" (downward arrow 240), hereby assuming an exemplary case where the measurement reporting scheme was suspended upon receiving the reconfiguration command denoted by the upward arrow 250 and where the suspended measurement reporting scheme will be resumed upon sending the reconfiguration complete message denoted by the downward arrow 245.

In an embodiment, the UE does not send any measurement reports when a reconfiguration procedure is ongoing and the UE waits for the starting time to be reached, but it keeps these reports in a list. When the starting time is expired and the reconfiguration confirm message must be send to UTRAN, UE verifies all those reports in the list and only send those reports, for which the conditions are still fulfilled. This has the effect that only reports are sent to and handled by UTRAN which contain up to date information.

In an embodiment, no measurement reports will be sent while waiting for the starting time (completion of reconfiguration) to be reached. Upon elapsing of starting time some reports might need to be sent out. These measurement reports are not sent in several separate peer messages, but are contained in or are attached to the reconfiguration complete message itself. This has the effect to support a correct handling of those reports by UTRAN. This has the further effect to make UTRAN aware of the situation that these measurement reports have been triggered during the reconfiguration was ongoing.

In an embodiment, the measurement reports attached to or contained in the reconfiguration complete message are sorted by the UE according to their priority. Some events are more important to keep the call then others. For example, it is more important to add a good neighbour cell soon than to remove a weak cell from the connection or requesting higher data rates. By sorting the measurement reports contained in the reconfiguration complete message by priority and by handling the reports according to this sorting in the network, the effect occurs that the network handles those reports first, which have most influence on keeping the call instead of dropping it.

Figure 3:
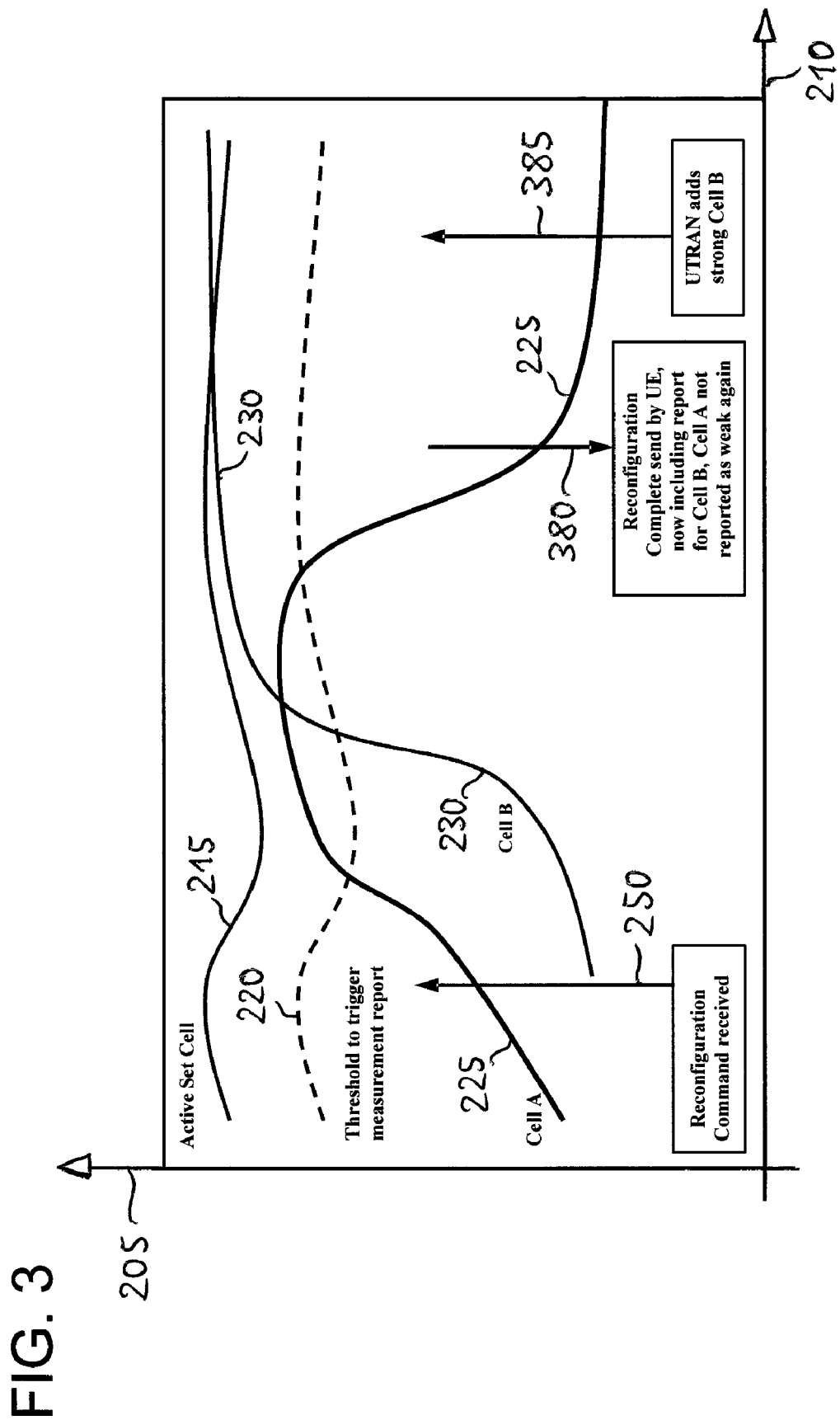
FIG. 3 shows another scenario of measurement reporting and radio connection reconfiguration in accordance with embodiments of the invention.

In FIG. 3 another scenario of measurement reporting and radio connection reconfiguration in accordance with embodiments of the invention is shown. It illustrates the improved behaviour according to the embodiments of the invention which has the effect that upon completion of a reconfiguration the currently best cells are added to the connection.

The vertical axis 205 represents a radio connection quality parameter, for example a received radio signal strength, at the cellular radio terminal 200. The horizontal axis 210 represents time.

The curve 215 indicates the signal from an "Active Set Cell" over time. The dashed curve 220 indicates a threshold to trigger measurement reports. The threshold depends on the signal from the "Active Set Cell" and therefore varies with time. Any new cells entering the reception range and exhibiting a signal above the current threshold value have to be reported to the network in a measurement report. The curve 225 indicates the signal from another "Cell A" over time. The curve 230 indicates the signal from yet another "Cell B" over time.

The downward arrow 380 symbolizes a reconfiguration complete message sent from the cellular radio terminal 200 to the network. The upward arrows 250, 385 symbolize messages sent from the network to the cellular radio terminal 200. The individual positions of the downward arrow 380 and the upward arrows 250, 385 along the horizontal axis 210 indicate the individual points of time when the respective messages are sent.

The scenario of FIG. 3 is based on the principles of the method of measurement reporting shown in the flow diagram 100 (FIG. 1) and on a cellular radio terminal 200 (UE) which is configured to carry out the method of measurement reporting shown in the flow diagram 100.

It is assumed that at the beginning the measurement reporting scheme used at the cellular radio terminal 200 is active. Then a reconfiguration is started by a reconfiguration command. Upon reception of the reconfiguration command (upward arrow 250) the measurement reporting scheme is suspended.

Now the signal from neighbour cell A (curve 225) increases and crosses the threshold (dashed curve 220). In case of an active measurement reporting scheme this would cause to send a measurement report to request cell A to be added to the connection. But here, with the suspended measurement reporting scheme as the reconfiguration is still ongoing, the UE does not send a measurement report for cell A, but keeps (stores) an information about the occurrence of a measurement reporting event for later following evaluations. Also the signal from cell B (curve 230) increases and crosses the threshold (dashed curve 220) and also for cell B no measurement report is sent, but the reporting event is stored. After that the signal from cell A (curve 225) decreases again and becomes so weak that it makes no sense anymore to add this cell to the connection.

After the starting time associated with the reconfiguration is elapsed and the reconfiguration on UE side is finished, the new radio connection configuration is applied. Upon completion of the radio connection reconfiguration the suspended measurement reporting scheme is resumed, i.e. it is active again from then on. Furthermore, now the UE evaluates the stored measurement results (stored measurement reporting events) again. As the signal from cell A has decreased again and is now below the threshold there is no need to send any measurement report for this cell. But the signal from cell B is still very good and above the threshold. The UE includes a measurement report for cell B in the reconfiguration complete message (downward arrow 380) and sends it out to the network. The network handles the reconfiguration complete message and reacts on the included measurement report by addition of that cell to the connection (upward arrow 385).

In an embodiment, one or more measurement reports which are to be sent upon the completion of the radio connection reconfiguration are included as ASN1-coded octet strings in the reconfiguration complete message. An example message written in pseudo code is shown below.

```
value UL_DCCH_Message ::= {
    message
        uL_DCCH_MessageType_radioBearerReconfigurationComplete : {
            rrc_TransactionIdentifier 0
            rrc_measurement_reports : {
                { 0x40, 0x22, 0x03 .............. },
                { 0x40, 0x20, 0xA2 .............. }
            }
        }
}
```

According to an embodiment of the invention, any embodiment defined by one of the claims may be combined with any one or more other embodiments defined by respective one or more of the other claims.

| Abbreviations used in this document: | |
| --- | --- |
| 3GPP | Third Generation Partnership Project |
| AS | Active Set |
| ASU | Active Set Update |
| CPICH | Common Pilot Channel |
| DL | Downlink |
| FDD | Frequency Division Duplex |
| MR | Measurement Report |
| RSCP | Received Signal Code Power |
| RSSI | Received Signal Strength Indicator |
| UE | User Equipment |
| UL | Uplink |
| UMTS | Universal Mobile Telecommunications System |
| UTRAN | UMTS Terrestrial Radio Access Network |
| W-CDMA | Wideband Code Division Multiple Access |

Documents cited in this document:
[1] 3GPP TS 25.331: Radio Resource Protocol—RRC protocol specification

The invention claimed is:

1. A method of measurement reporting of cell quality in a cellular radio network, comprising:
   receiving, while a measurement reporting scheme is active, a request for a radio connection reconfiguration;
   suspending the measurement reporting scheme upon the receiving the request; and
   resuming the suspended measurement reporting scheme upon a completion of the radio connection reconfiguration;
   storing one or more measurement reporting events, the one or more measurement reporting events occurring after the suspending and before the resuming;
   sending one or more measurement reports, the one or more measurement reports reporting corresponding ones of the stored one or more measurement reporting events, at or after the completion of the radio connection reconfiguration; and
   wherein the radio connection reconfiguration adjusts which cell or cells are used in communicating on the cellular radio network.

2. The method as recited in claim 1, wherein the one or more measurement reports are included in a message, the message indicating the completion of the radio connection reconfiguration.

3. The method as recited in claim 1, further comprising:
   verifying a validity of the stored one or more measurement reporting events at the completion of the radio connection reconfiguration.

4. The method as recited in claim 1, wherein the one or more measurement reports report only such of the stored one or more measurement reporting events, which are still valid at the completion of the radio connection reconfiguration.

5. The method as recited in claim 1, wherein the one or more measurement reports include a priority information.

6. The method as recited in claim 1, wherein the one or more measurement reports are sorted according to their priority.

7. A cellular radio terminal comprising:
   a transmitter;
   a receiver;
   a microprocessor capable of controlling the transmitter and the receiver; and
   a memory coupled to the microprocessor;
   wherein the transmitter is capable of transmitting measurement reports of cell quality in a cellular radio network;
   wherein the receiver is capable of receiving a request for a radio connection reconfiguration while a measurement reporting scheme is active;
   wherein the radio connection reconfiguration adjusts which cell or cells are used in communicating on the cellular radio network;
   wherein the microprocessor is configured to suspend a measurement reporting scheme upon receiving a request for a radio connection reconfiguration, the microprocessor further configured to resume the suspended measurement reporting scheme upon a completion of the radio connection reconfiguration; and
   wherein the memory stores one or more measurement reporting events, the one or more measurement reporting events occurring after the suspending suspension of the measurement reporting scheme upon the reception of a request for a radio connection reconfiguration, and the one or more measurement reporting events occurring before the resumption of the suspended measurement reporting scheme upon a completion of the radio connection reconfiguration.

8. The cellular radio terminal as recited in claim 7, the microprocessor configured to control the transmitter to further send one or more measurement reports at or after the completion of the radio connection reconfiguration, the one or more measurement reports reporting corresponding to one of the stored one or more measurement reporting events.

9. The cellular radio terminal as recited in claim 7, the microprocessor configured further to verify a validity of the stored one or more measurement reporting events at the completion of the radio connection reconfiguration.

10. The cellular radio terminal as recited in claim 7, the transmitter further to send one or more measurement reports, the one or more measurement reports included in a message, the message indicating the completion of the radio connection reconfiguration.

* * * * *